(12) United States Patent
Matsushiro

(10) Patent No.: US 6,928,397 B1
(45) Date of Patent: Aug. 9, 2005

(54) METHOD AND DEVICE OF IMAGE TRANSFORM

(75) Inventor: Nobuhito Matsushiro, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 09/310,024

(22) Filed: May 11, 1999

(30) Foreign Application Priority Data

May 11, 1998 (JP) .......................................... 10-145036

(51) Int. Cl.[7] .......................... G06F 17/10; G06K 9/36; G06G 7/48
(52) U.S. Cl. ................. 703/2; 703/6; 382/249
(58) Field of Search ......................... 703/2, 6; 382/249

(56) References Cited

U.S. PATENT DOCUMENTS 5,065,447 A * 11/1991 Barnsley et al. ............. 382/249
5,148,497 A * 9/1992 Pentland et al. ............. 382/249
6,111,988 A * 8/2000 Horowitz et al. ........... 382/249

OTHER PUBLICATIONS

Barnsley, M.F., et al., *Fractal Image Compression*, Chapter 6, pp. 173–197, A.K. Peters, Ltd., Wellesley, MA (1992).

* cited by examiner

*Primary Examiner*—Hugh Jones
(74) *Attorney, Agent, or Firm*—Akin, Gump, Strauss, Hauer & Feld, LLP

(57) ABSTRACT

A method of image transforming is proposed. The method includes generating from an original image having a plurality of original picture elements, a new picture element from the plurality of original picture elements that are neighboring, and forming a first transformation image by arranging the new picture element among the plurality of original picture elements; dividing the original image into a plurality of first regions each having picture elements, searching respective second regions each having picture elements corresponding to the picture elements in the first region, and forming a second transformation image by transforming the picture elements in the first region into the picture elements in the second region; comparing values of respective picture elements in respective corresponding regions of the first transformation image and the second transformation image; and on the basis of the comparison result, deciding to output one of the regions in the first transformation image and the second transformation image.

7 Claims, 8 Drawing Sheets

(a)

(b)

(c)

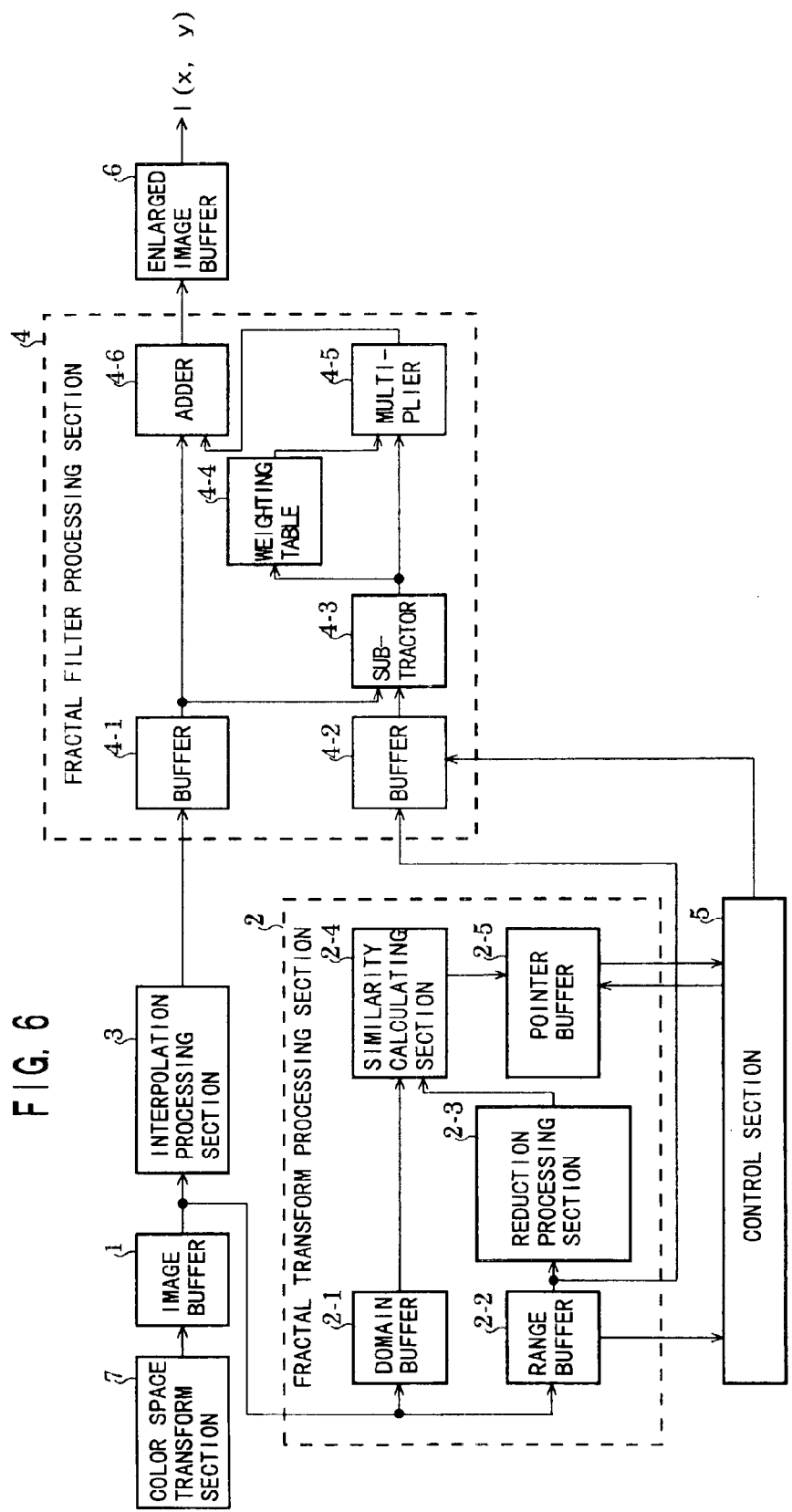
F I G. 6

METHOD AND DEVICE OF IMAGE TRANSFORM

BACKGROUND OF THE INVENTION

1. Field of the Invention

The present invention relates to a method and device for transforming an input image to an output image having a large number of picture elements.

2. Description of the Related Art

Image transform processing has been performed, for example, to enlarge image data for printing or displaying. Ordinarily, interpolation processing is used for enlarging an image. In this interpolation processing, a new picture element is added between picture elements neighboring each other, and the value of each added picture element is set to an averaged value of the picture elements surrounding the picture element to be added. However, the image quality obtained by this interpolation processing is inferior in terms of clarity.

On the other hand, a method of performing image transform with higher accuracy has been also reported (M. F. Barnsley: "Fractal Image Compression", AK Peters Ltd.). This report describes a technology concerning a method of compressing image data on the basis of Fractal self-similarity theory. Though mention has been made of the data compression method to be used for data storage or transfer in this report, this technology can be also applied directly to image transform processing for enlarging an image. Such applications are described below.

As a first step, an input image consisting of M×N (1<M, N) picture elements (one picture element having k [1<k] bit tone) is divided to a square block (hereinafter referred to as "domain block") having i×i (1<i<M, N) picture elements. Then, a tetragonal block (referred to as "range block") of j×j (i<j) picture elements is defined for each domain block. For each range block is defined in the input image, the image within this block is stored. The range block having the image presenting the highest self-similarity to the image within the domain block is found. The self-similarity refers to the similarity between a reduced image of the range block obtained by reducing the range block image to a size of the domain block and the image of the domain block. The similarity is measured by a specified standard. By finding the range block image having the highest self-similarity to each domain block image in the input image and by replacing all the domain block images with the range block image having the highest similarity, an image magnified by j/i times is obtained.

If the domain block image is replaced with a range block image by Fractal transform processing, an image transform with high faithfulness (resolution) within each range block image is obtained. However, because each range block image is extracted from any region within the input image, there is no image continuity in the boundaries of each range block. For this reason, the sequential replacement of all the domain block images with the range block images causes image continuity to be lacking at the boundaries of each range block, presenting a problem in image quality in the boundary region.

SUMMARY OF THE INVENTION

The present invention provides a method of image transform characterized by transforming an original image to an interpolation transformed image magnified up to a predetermined magnification by (1) interpolation processing of values of each picture element, (2) by performing Fractal processing of the original image and transforming it to a Fractal transformed image magnified up to the predetermined magnification and having the similarity and, (3) by creating an enlarged image using picture element values used for enlargement of images obtained by performing an operation for correction of picture element values of both corresponding picture elements of the interpolation transformed image and the Fractal transformed image.

In the operation for the correction described above, the weighted difference in picture element values between both corresponding picture elements of the interpolation and fractal transformed images is added to picture element values of either of the interpolation transformed image or Fractal transformed image to calculate the picture element values to be used for enlargement of images.

In the Fractal processing described above, the original image: (1) is divided into two or more domain blocks, (2) two or more range block images having the similarity to the image of each domain block are selected, (3) averaged values of corresponding picture element values of each range block image are calculated, and (4) the Fractal transformed image is then created from the range block image having the averaged value.

Also, in the Fractal processing, though the original image is divided into two or more domain blocks and the range block image having the highest similarity to images of each domain block is selected, if the degree of similarity of the range block image is lower than a set threshold, the picture element value of the range block image can be replaced, without the operation for the correction, with the corresponding picture element values of the interpolation transformed image.

Moreover, the original image is a color image resolved by each color component in specified color space.

According to a further aspect of the present invention, a method of image transform is provided which is characterized by: (1) performing interpolation processing of picture element values of the original image and transforming it to an interpolation transformed image magnified up to a predetermined magnification, (2) by performing Fractal processing and by transforming the original image to the Fractal transformed image magnified up to the predetermined magnification and having the similarity, and (3) if the difference in picture element values between both corresponding picture elements of the interpolation transformed image and the Fractal transformed image is larger than a set threshold, the value of picture elements of the Fractal transformed image is replaced with picture element values of the corresponding picture element of interpolation transformed image.

According to further aspect of the present invention, a device of image transform is provided comprising: (1) an interpolation processing section which performs interpolation processing of picture element values of each picture element and transforms an original image to an interpolation transformed image magnified up to a predetermined magnification, (2) a Fractal transform processing section which performs Fractal processing and transforms the original image to a Fractal transformed image magnified up to the predetermined magnification and having the similarity, and (3) a Fractal filter processing section which performs an operation for correction of picture element values of both corresponding picture elements of the interpolation transformed image and the Fractal transformed image and outputs picture element values for enlargement of the image.

The Fractal filter processing section calculates picture element values used for the enlargement of images by weighting the difference in picture element values between both corresponding picture elements of the images and by adding the weighted difference to the picture element values of either of said interpolation transformed image and the Fractal transformed image.

BRIEF DESCRIPTION OF THE DRAWINGS

The features of the invention will become apparent from the following detailed description of the preferred embodiments when taken in conjunction with the drawings in which:

FIG. 6 is a block diagram illustrating the image transform device described in Embodiment 2.

DETAILED DESCRIPTION OF THE INVENTION AND PREFERRED EMBODIMENTS

The best mode of carrying out the present invention will be described hereafter using various embodiments.

According to the present invention, as a first step, linear interpolation processing of picture element values is performed, and an input image is magnified up to a desired magnification obtaining an interpolation transformed image.

Simultaneously, the input image is divided into two or more domain blocks each having a predetermined size. Also, a range block image of high similarity to the domain block image based on Fractal self-similarity theory is searched. The size of each range block is set to the size of a domain block magnified by the interpolation transform magnification. Then, by replacing each domain block image in the input image with the range block image having high similarity to the domain block image, a Fractal transformed image is obtained.

After the creation of both the interpolation transformed image and the Fractal transformed image each having the same size, the interpolation transformed image and Fractal transformed image are processed by a Fractal filter processing section.

That is, the Fractal filter processing section outputs enlarged image data having high faithfulness and image quality by assuring the continuity of the whole image via operations of picture element values of the interpolation transformed image and Fractal transformed image and by ensuring the faithfulness in detailed regions of an image.

Embodiments of the present invention will be described in details below with reference to the accompanying drawings.

Embodiment 1

Figure 1:
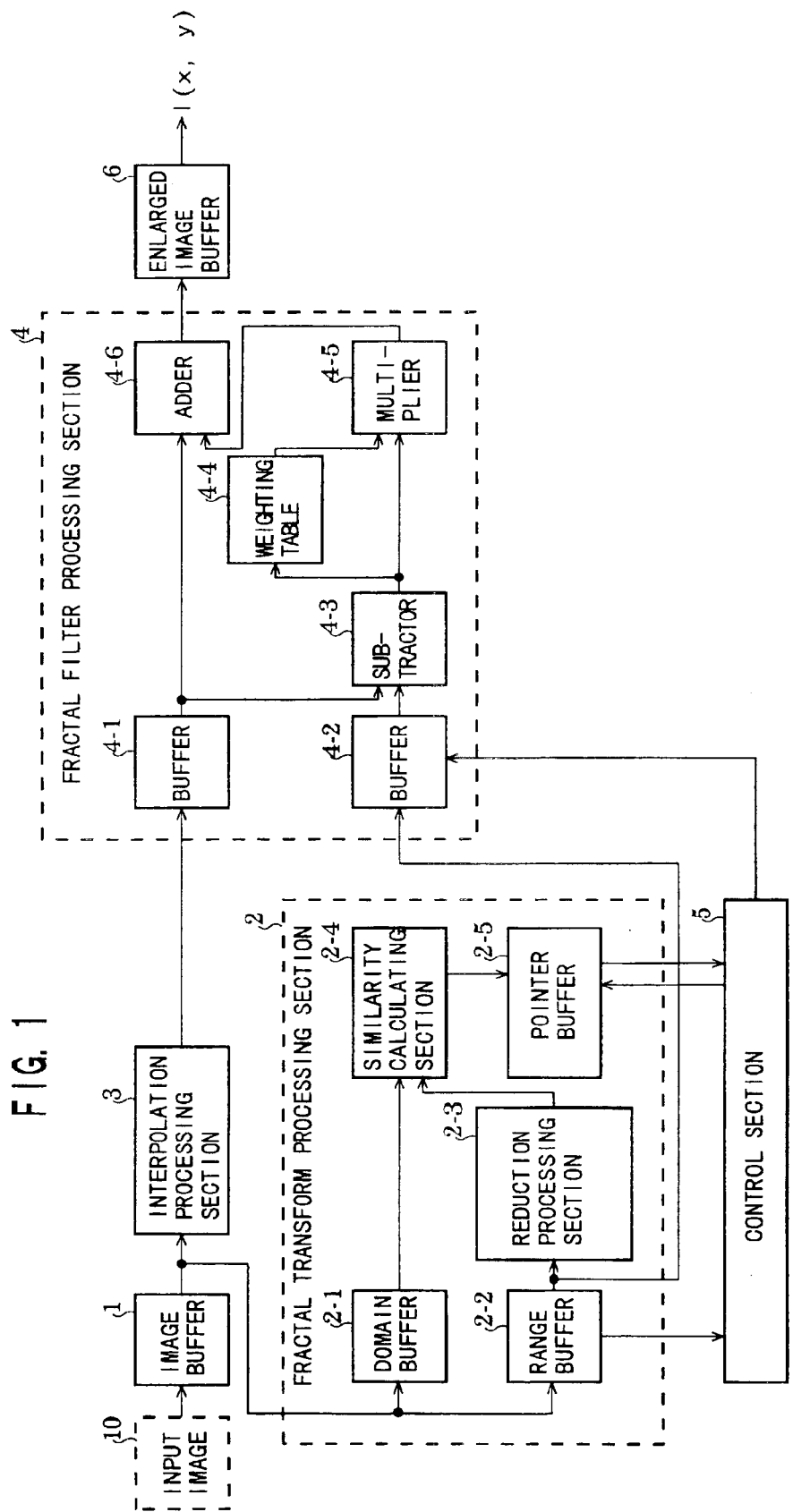
FIG. 1 is a block diagram illustrating an image transform device described in Embodiment 1.

FIG. 1 is a block diagram illustrating an image transform device described in Embodiment 1. The image transform device is comprised of an image buffer 1, Fractal transform processing section 2, interpolation processing section 3 and Fractal filter processing section 4. The interpolation processing section 3 generates and outputs an interpolation transformed image. The Fractal transform processing section 2 generates and outputs a Fractal transformed image.

Signal lines (not shown) are connected to the input side of the image buffer 1 to receive the input image 10 to be used as an original image. The Fractal transform processing section 2 and interpolation processing section 3 are connected to the output side of the image buffer 1. The output of the Fractal transform processing section 2 is connected to a buffer 4-2 and the output of the interpolation processing section 3 to a buffer 4-1. The Fractal filter processing section 4 outputs picture element values to be used to obtain an enlarged output image I (x, y).

The Fractal transform processing section 2 consists of a domain buffer 2-1, range buffer 2—2, reduction processing section 2-3, similarity calculating section 2-4 and pointer buffer 2-5. The domain buffer 2-1 and range buffer 2-2 are connected to the output of the image buffer 1. The output of the domain buffer 2-1 is connected to the input of the similarity calculating section 2-4. The output of the range buffer 2—2 is connected to the input of the reduction processing section 2-3 and to the input of the buffer 4-2 of the Fractal filter processing section 4. The output of the reduction processing section 2-3 is connected to the input of the similarity calculating section 2-4. The output of the similarity calculating section 2-4 is connected to the input of the pointer buffer 2-5.

A control section 5 is comprised of processors and the like to control each section of the device including this Fractal transform processing section 2. The Fractal filter processing section 4 consists of the buffer 4-1, buffer 4-2, subtracter 4-3, weighting table 4—4, multiplier 4-5 and adder 4-6. The input of the buffer 4-1 is connected to the output of the interpolation processing section 3. This buffer 4-1 receives an interpolation transformed image outputted from the interpolation processing section 3. The input of the buffer 4-2 is connected to the output of the Fractal transform processing section 2. The output of the buffer 4-1 is connected to the inputs of the subtracter 4-3 and the adder 4-6.

The output of the buffer 4-2 is connected to the input of the subtracter 4-3. The output of the subtracter 4-3 is connected to the inputs of the weighting table 4—4 and the multiplier 4-5. The output of the weighting table 4—4 is also connected to the input side of the multiplier 4-5. The output of the multiplier 4-5 is connected to the input side of the adder 4-6. The adder 4-6 outputs a desired picture element value D described later.

The operation of the Fractal transform processing section 2 is described below.

Figure 2:
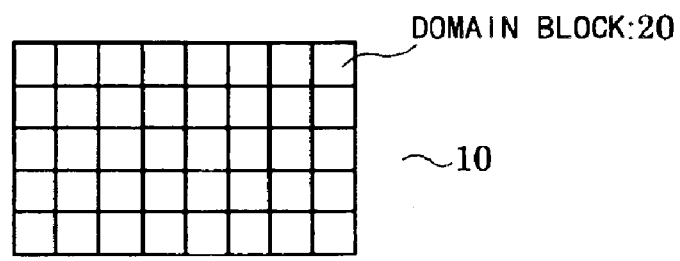
FIG. 2a shows an example of an input image having M×N picture elements.
FIG. 2b shows an exemplary domain block and an exemplary range block in the input image.
FIG. 2c shows a fractal transformed image.
Figure 2:
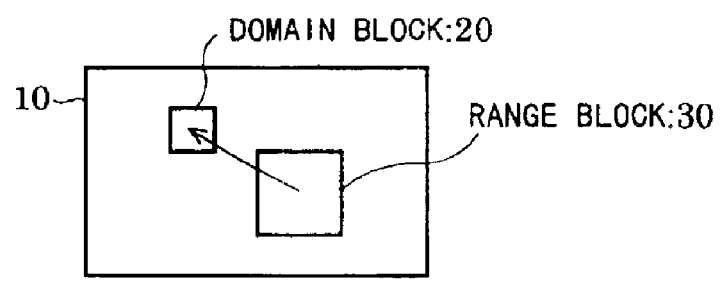
Figure 2:
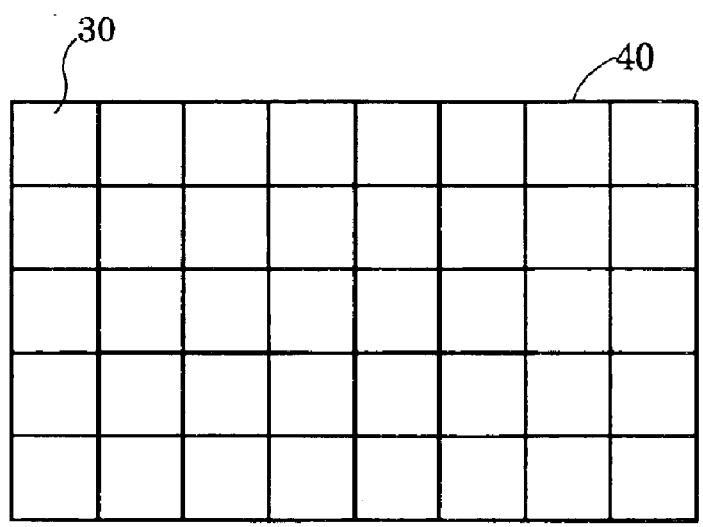

FIG. 2 is an explanatory drawing of basic operations of the Fractal transform processing section.

FIG. 2(a) shows, as an example, that the input image 10 is an image consisting of M×N picture elements. This input image is divided into a plurality of domain blocks 20, each consisting of (i×i) picture elements. In the example shown in FIG. 2(a), the input image 10 is divided into domain blocks 20, the input image consisting of 8 domain blocks wide and 5 domain blocks long, being 40 domain blocks in total.

The input image 10 is now transformed so that the number of picture elements both in the vertical and the horizontal directions are doubled, thereby enlarging the image area by 4 times. Simultaneously, by linear interpolation of the picture elements, range blocks 30 (j×j) are obtained by doubling (2ik=j) the picture elements in vertical and horizontal directions of each domain block 20 in the input image 10. This magnification conforms to that used for the interpolation transform. As shown in FIG. 2(b), images of the range blocks 30 set in the input image 10 are scanned to find the range block having an image similar to that in the domain block 20. When a range block 30 having an image similar to that in the domain block 20 is found, the image in the domain block 20 shown in FIG. 2(a) is replaced one by one in the range block 30. Thus, as shown in FIG. 2(c), a Fractal transformed image 40 in which images selected within the range block 30 are arranged so as to correspond to images in the domain block is obtained.

The input image 10 is latched in the image buffer 1 shown in FIG. 1. Images in the specified domain block 20 are stored in the domain buffer 2-1 and images in the range block 30 to be set sequentially in the input image 10 are stored in the range buffer 2—2. The capacity of each buffer is set to a required level.

The reduction processing section 2-3 reduces the size of each range block image by one-half both in the vertical and horizontal directions so that the range block image from the range buffer 2—2 has the same size as the domain block image in the domain buffer 2-1. The similarity between the reduced range block image and the domain block image in the domain buffer 2 is compared and calculated by the similarity calculating section 2-4. The similarity calculating section 2-4 contains a buffer which stores the similarity previously obtained every time the maximum degree of the similarity is achieved. When the similarity is stored by the buffer, coordinate values of a start point of the corresponding range block image are written in the pointer buffer 2-5. This means that coordinate values of the start point in the pointer buffer 2-5 are stored one after another.

When the Fractal processing for one domain block 20 is completed by the Fractal transform processing section 2, the control section 5 judges whether the image of the range block 30 designated by coordinate values of the start point finally remaining in the pointer buffer 2-5 is the most similar to the image of the domain block 20. The control section 5 reads the range block image out of the image buffer 1 and stores it into the range buffer 2—2, causing it to be transferred to the buffer 4-2 of the Fractal filter processing section 4.

The interpolation processing section 3 performs interpolation processing of 4-neighbors of the picture elements in the input image.

Figure 3:
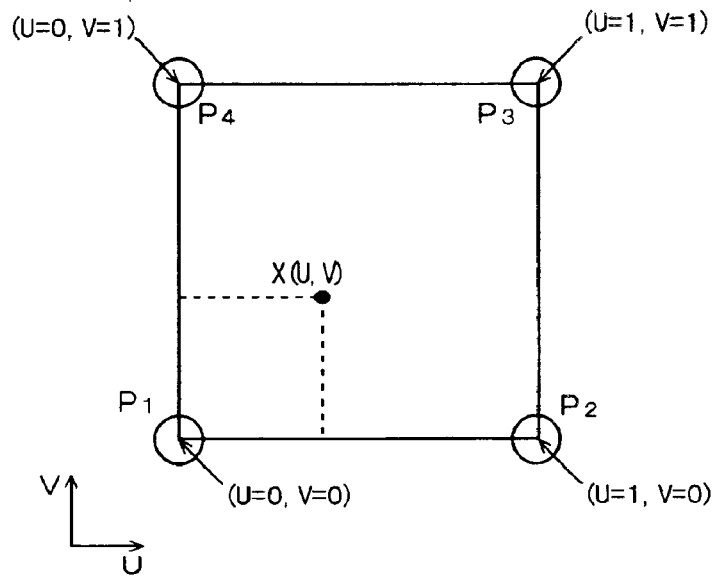
FIG. 3 is an explanatory drawing of operations in interpolation processing.

FIG. 3 is an explanatory drawing of operations of the interpolation processing section 3. The interpolation processing section 3, as shown in FIG. 3 for example, set any number of picture elements required for enlarging transform of an image among 4-neighbors picture elements and calculate their picture element values. This calculation method has been already known and one of it has been given here just as an example.

Referring to FIG. 3, the picture element values and positional coordinates of the 4 picture elements are set as P1(U=0, V=0), P2(U=1, V=0), P3(U=1, V=1) and P4(U=0, V=1) respectively. In this example, the picture element value X (U, V) of a point standing at an intermediate position can be obtained by the following formula.

$$P(1)=(1-U)P1+UP2 \quad (1)$$

$$P(2)=(1-U)P4+UP3 \quad (2)$$

$$X=(1-V)P(1)+VP(2) \quad (3).$$

The picture element value of each picture element standing between the 2 picture elements is calculated on the presumption that linear transform from one to the other direction is performed. The interpolation transformed image is created by performing such calculation of picture element values of all picture elements of the input image 10 and the result is stored in the buffer 4-1 of the Fractal filter processing section 4.

The Fractal filter processing section 4, by using the following formula (4), performs operations of each picture element value of the interpolation transformed image and the image of the range block 30.

$$D(x,y)=Dh(x,y)+w(x,y)\times(Df(x,y)-Dh(x,y)) \quad (4).$$

By the term of "Df(x,y)–Dh (x,y)" in this formula, the difference in picture element values between the picture elements existing in the coordinates (x, y) in the image Df of the range block 30 and the picture elements existing in the coordinates (x,y) in the interpolation transformed image Dh is calculated using the subtracter 4-3.

The interpolation transformed image is obtained by interpolation of picture element values through linear interpolation processing. In the operation for the interpolation, a picture element value of a new picture element among picture elements is found on the presumption that no rapid change in picture element values of neighboring picture elements occurs. Therefore, when the input image is handled as analog image data and Fourier transform is performed on the image data, the corresponding image regions in the input image is reproduced faithfully in the form of low frequency components.

On the other hand, the image of the range block 30 is an image obtained by precise reproduction of the domain block image in the input image and, when Fourier transform is performed, it contains components of low frequency and high frequency. Accordingly, to perform analog signal processing on the input image, with low frequency components of the image of the range block 30 subtracted by operations of the term "(Df(x,y)–Dh(x,y))", only high frequency components are extracted as the difference in the picture element value.

In the term of "w(x,y)×(Df(x,y)–Dh(x,y)), the product of the difference (high frequency components) in the picture element value and weighting coefficient w (x,y) within the weighting table 4—4 is obtained using the multiplier 4-5.

Moreover, as given in the formula (4), the picture element value D (x,y) of the enlarged image is calculated by obtaining the product of the difference in the picture element value and the weighting coefficient w (x,y) and then by adding this product to the picture element value Dh (x,y) of the interpolation transformed image using the adder 4-6.

Figure 4:
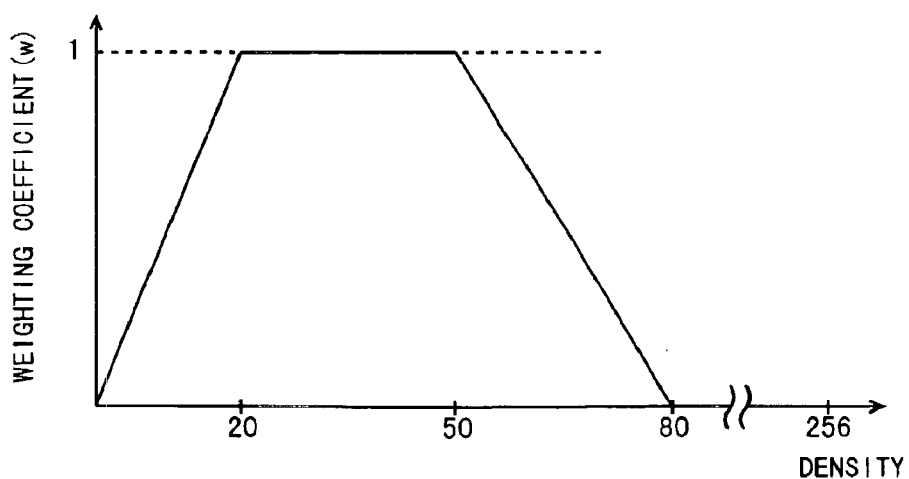
FIG. 4 is an explanatory drawing of a weighting coefficient.

FIG. 4 is an explanatory drawing of weighting coefficient.

As shown in FIG. 4, if the density represented as the difference in the picture element value is 80/256 and more, the weighting coefficient w is set to "0" and if the density is in the range of 20/256~50/256, the coefficient is set to "1". Furthermore, if the density is within the range of 0/256~20/256 and 50/256~256/256, the weighting coefficient is changed linearly in the range of 0~1. Also, for example, if the picture element value is used to display black-and-white image, the density of 0/256 and 256/256 is for white and black images respectively.

The operations of the device of the present invention is described using a flow-chart below.

Figure 5:
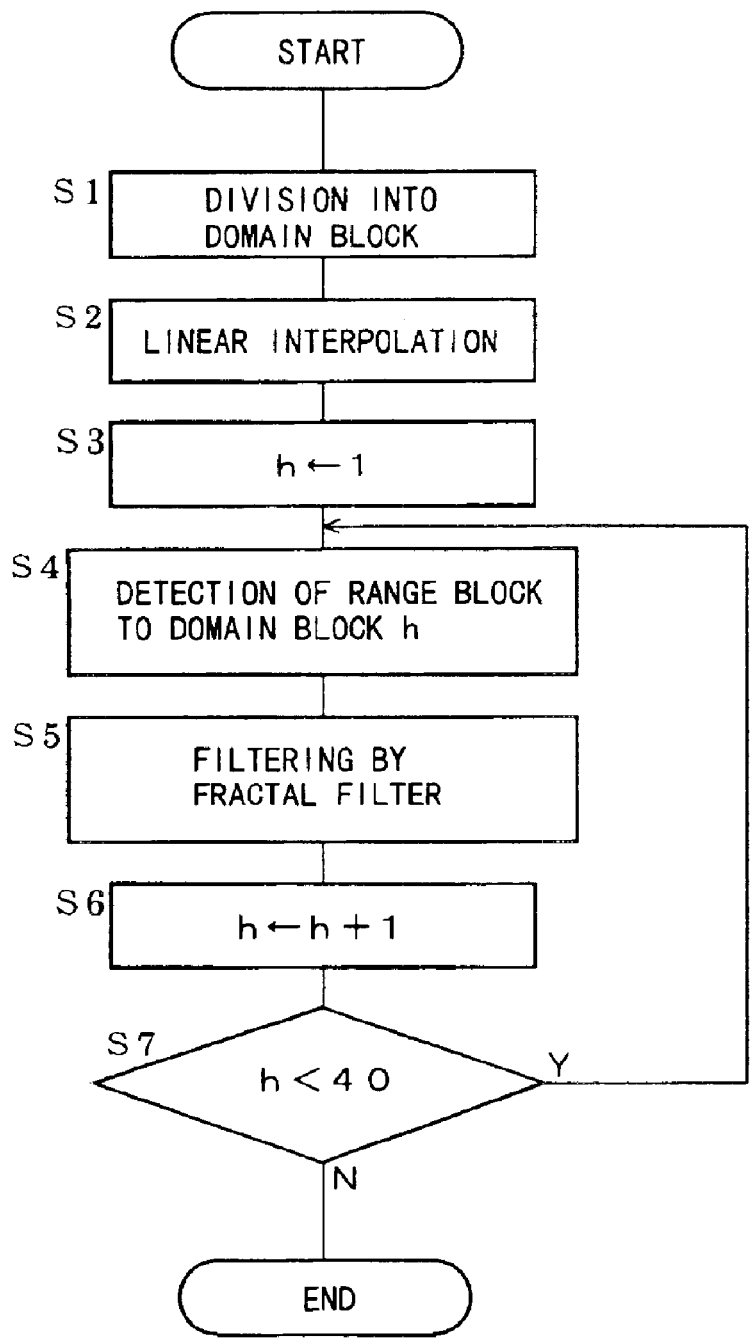
FIG. 5 is an operational flowchart of a whole device described in Embodiment 1.

FIG. 5 is an operational flowchart of a whole device described in Embodiment 1. The description is here made on the presumption that the input image is a mono chrome image and that j/i=2.

Step 1: The control section 5 divides an input image having M×N picture elements into a domain block having i×i picture elements.

Step 2: The interpolation processing section, by a linear interpolation of 4-neighbors picture elements, enlarges the input image with M×N picture elements, which has doubled picture elements both in the vertical and horizontal directions, thus quadrupled numbers of the picture elements.

Step 3: The control section 5 initializes the domain block number h having i×i picture elements.

Step 4: The Fractal transform processing section 2 searches the range block image having the highest self-similarity to the image of the domain block h. That is, a averaged value of each picture element value of 2×2 picture elements for each candidate of the range block is obtained and the reduction is made using this averaged value as one picture element and then an averaged value of squared error in picture elements between the image reduced by one-half and the domain block image is obtained. A range block having the smallest (largest in terms of self-similarity) value obtained above is judged to be the range block used to replace the domain block h.

Step 5: The Fractal filter processing section 4 performs filtering by operations of the above formula (4).

Step 6: The control section 5 increments the domain block number h.

Step 7: The control section 5, if there are unprocessed domain blocks left, continues processing after the return to Step 4. If they are not left, all the processing is terminated.

The Fractal filter processing section 4 sequentially stores the enlarged image consisting of the picture element value D (x,y) into the buffer 6 for enlargement of the image shown in FIG. 1. Thus, an enlarged image I (x,y) is obtained.

As described above, because the composite image consisting of an image portion having a faithfully reproduced interpolation transformed image and a high-resolution image portion having a faithfully reproduced Fractal transformed image is obtained, an enlarged image of high quality can be created accordingly.

In Embodiment 1 described above, though the picture element value D of an enlarged image is obtained on the basis of a picture element value Dh of the interpolation transformed image, as shown in Formula (5) below, the picture element value D may be also obtained on the basis of a picture element value Df of the Fractal transformed image.

$$D(x,y)=Df(x,y)+W(x,y)\times(Df(x,y)-Dh(x,y)) \quad (5).$$

Also, the same effect can be achieved by obtaining a difference in picture element values contained in the interpolation transformed image and the Fractal transformed image and then selecting the picture element value contained in the interpolation transformed image if the difference in the picture element value is remarkable and selecting the picture element value contained in the Fractal transformed image if the difference is not remarkable. Therefore, the same processing can be also performed by using a selector circuit wherein the difference in the picture element value between the interpolation transformed image and the Fractal transformed image is compared with a set threshold and either of the picture element value is selected by the comparison and outputted. However, as described above, the image quality is more improved by weighting processing. Because the result varies depending on types of an image, it is better to determine the weighting coefficient so that the results from repeated experiment can be reflected thereto.

Moreover, the same effect can be achieved by obtaining the degree of similarity in each picture element between the domain block and range block and by comparing it with a predetermined threshold for processing. If the degree of similarity is less than this threshold, because it means that the difference in the picture element value between the domain block and the range block is remarkable, the operation of each picture element value contained in the interpolation transformed image and the Fractal transformed image is omitted and the corresponding picture element value of the interpolation transformed image is selected. Because, in this case, the processing by the Fractal filter processing section is allowed to be omitted, the processing is speeded up as a whole.

Embodiment 2

The embodiment using a color image as an input image is hereafter described.

According to this Embodiment 2 of the present invention, an enlarged image having high image quality and excellent resolution, if a color image in particular is used as an input image, is obtained.

FIG. 6 is a block diagram illustrating the image transform device described in Embodiment 2.

In the device shown in FIG. 6, a color space transform section 7 used to perform a preliminary processing for the input image 10 is added to the device shown in Embodiment 1. This color space transform section 7 is used to perform transform processing of the color space from (R, G and B) color space to CIE's (International Commission on Illumination) standard color space L, a and b. By performing such color space transform, it becomes possible to change an input image to an image with color space more perceptible by a human being represented by color component signals and to improve the image quality of an enlarged image outputted from the Fractal filter processing section 4. This color space transform exerts an influence on the picture element values of a new picture element obtained by the interpolation processing. It is because, if color space is different, a picture element value of the interpolated picture becomes subtly different accordingly. In addition, in some cases, it may influence results from the Fractal transform processing. Though there is color space represented by color components other than described above, the color image having best transformed color space obtained on the basis of the quality of an image and results from an experiment should be used as an input image.

Because operations for processing an input image following the color space transform are the same as in Embodiment 1, double description is omitted. Due to a color image, processing is performed for each color component, i.e., if the transform is for (L, a, b) color space, processing is performed three times accordingly.

Figure 7:
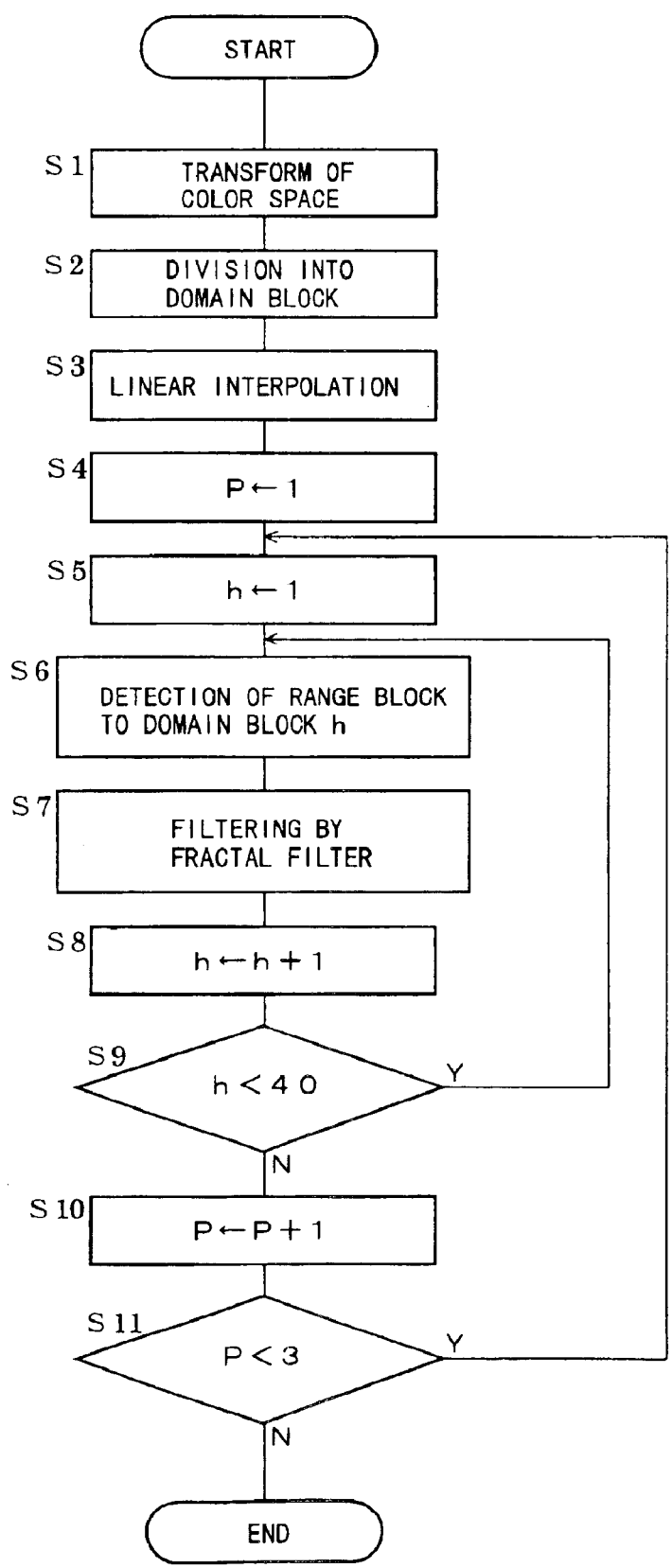
FIG. 7 is an operational flowchart of a device described in Embodiment 2.

FIG. 7 is an operational flowchart of a device described in Embodiment 2.

In this flowchart, processing shown as Step S1, Step S4, Step 10 and Step 11 is added to steps in the flowchart in FIG. 5. The contents of the processing with the same expression are the same as in the flowchart in FIG. 5, however, the step number has been changed somewhat due to the addition of the steps. Step S1 is transform processing of color space. Step 4 and 11 are used to control repeated processing of sequential execution for 3 pieces of color planes. P is a parameter for repeated processing and its maximum value is 3. Step 10 is used to increment this parameter P.

According to Embodiment 2 of the present invention, by using an image resolved for each color component in color space being more perceptible by a human and having picture elements transformed to those being more perceptible by a human in color space as an input image, an enlarged color image of higher quality can be obtained.

Embodiment 3

In Embodiment 1, by detecting a range block image having the highest similarity to a domain block image, a Fractal transformed image is obtained. There may be, however, cases where the similarity of the range block images to the domain block image is low. In this Embodiment, two or more range blocks, as candidate blocks, having images relatively high similarity to one domain block image are introduced. Then, by averaging picture element value of the two or more range blocks having relatively high similarity to the domain block image, a new range block image is created. As two or more candidate range blocks, for example, 2~8 range block images having high similarity can be selected. By using averaged values of picture element values of each block, a range block image containing no partially abnormal values can be obtained.

Figure 8:
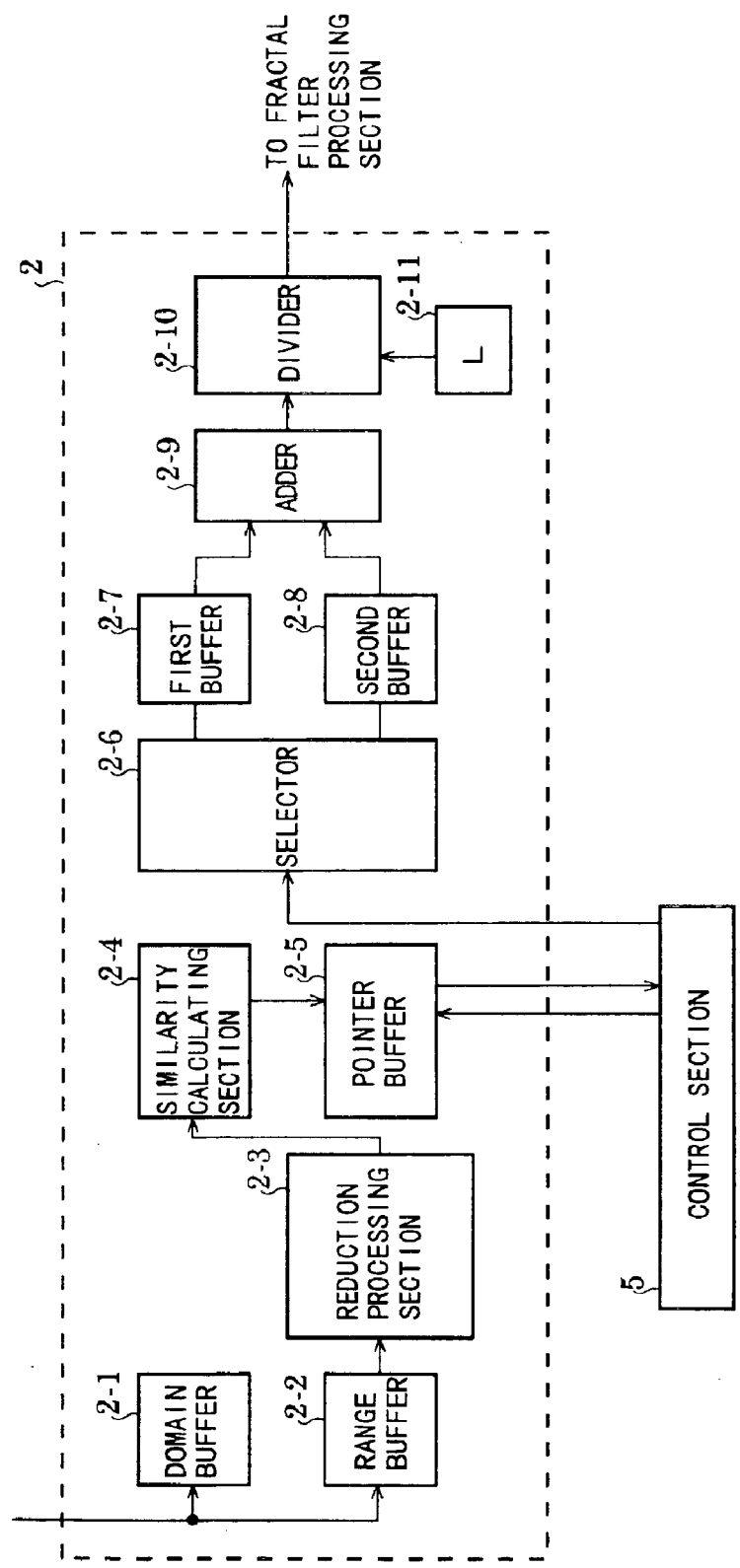
FIG. 8 is a block diagram showing a Fractal transform processing section of an image transform device described in Embodiment 3.

FIG. 8 is a block diagram showing a Fractal transform processing section of an image transform device described in Embodiment 3.

As shown in FIG. 8, the Fractal transform processing section 2, in addition to components shown in FIG. 1, includes a selector 26, First buffer 2-7, Second buffer 2-8, adder 2-9, divider 2-10 and divisor register 2-11.

Circuit blocks other than described above have the same functions as in FIG. 1. In the example as shown in FIG. 8, two candidate range block images are used and their picture element values are averaged. The pointer buffer 2-5 holds coordinate values of each start point of a range block with an image having the most highest similarity and of a range block with an image having the second highest similarity. When the candidates for two range block images are determined, their images are held in the First buffer 2-7 and Second buffer 2-8. The selector 2-6 is a circuit used to designate in which buffer the range block image should be stored.

Each picture element is fetched from areas of the First buffer 2-7 and the Second buffer 2-8 which correspond to each range block and is fed to the adder 2-9 for addition. Then, the result is given to the divider 2-10. The divider is adapted so that a divisor L (here L=2) is inputted and the division result is outputted. By this, averaged value of two picture element value is obtained. By performing processing on all picture elements in two range block, a range block image having high similarity can be created.

Figure 9:
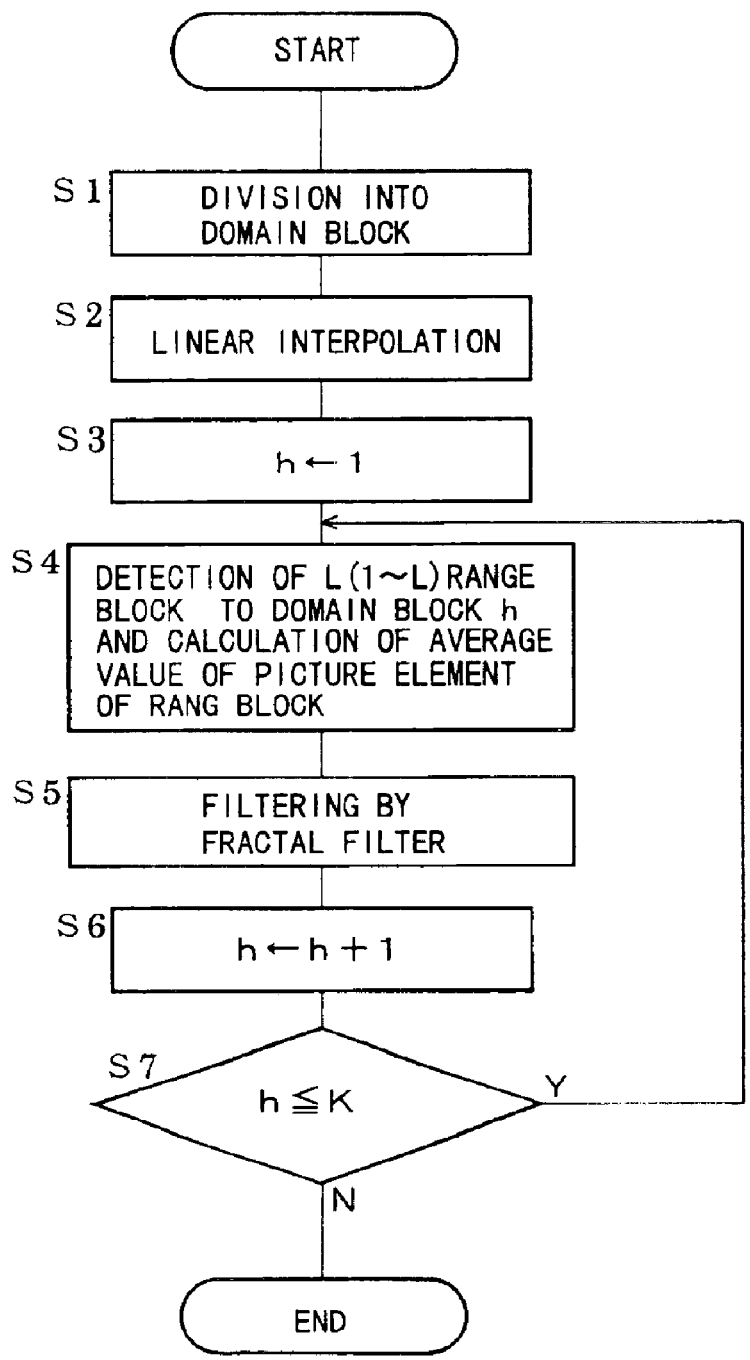
FIG. 9 is an operational flowchart of a device described in Embodiment 3.

FIG. 9 is an operational flowchart of a device described in Embodiment 3. The processing steps in Embodiment 3 are as follows.

Step 1: The control section 5 divides an input image into domain blocks.

Step 2: The interpolation processing section creates an interpolation transformed image from an input image by linear interpolation.

Step 3: The control section 5 initializes the domain block number h.

Step 4: The Fractal transform processing section 2 detects two range block images having self-similarity to the domain block h. By using the processing described above, a range block image created by averaged value of picture element value is obtained.

Step 5: The Fractal filter processing section 4 performs operations of the above Formula (4) and filtering.

Step 6: The control section 5 is used to increment the domain block number h.

Step 7: The control section 5, if there are unprocessed domain blocks left, continues processing after the return to Step 4. If they are not left, all the processing is terminated. The total number of the domain blocks are set to K.

According to Embodiment 3 of the present invention, by selecting two or more range blocks having relatively high similarity to the domain block image in the input image and by replacing the range block image in which picture elements have averaged values of picture element value of the range block image with the domain block image, even if there is no range block image having high similarity, an enlarged image of high quality can be obtained accordingly.

What is claimed is:

1. An apparatus for image transforming, comprising:

an interpolator for generating from an original image having a plurality of original picture elements, a new picture element from the plurality of original picture elements that are neighboring, and forming a first transformation image by arranging the new picture element among the plurality of original picture elements;

a fractal processor for dividing the original image into a plurality of first regions each having picture elements, searching respective second regions each having picture elements corresponding to the picture elements in the first region, and forming a second transformation image by transforming the picture elements in the first region into the picture elements in the second region;

a fractal filter for comparing values of respective picture elements in respective corresponding regions of the first transformation image and the second transformation image; and on the basis of the comparison result, deciding to output either the region in the first transformation image or the region in the second transformation image.

2. The image transforming apparatus according to claim 1, wherein values of the picture elements of the region in the first transformation image are compared with values of the picture elements of the corresponding region in the second transformation image, and the difference between the value in the first transformation image and the corresponding value in the second transformation image is calculated.

3. The image transforming apparatus according to claim 2, wherein, when the difference is bigger than a predetermined value, the picture element in the second region is transformed into the picture element in the first region.

4. The image transforming apparatus according to claim 2, wherein the difference is the level of high frequency components of the picture element.

5. The image transforming apparatus according to claim 1, wherein, when a first region corresponds to plural second regions, a second region is decided whose each picture element value is obtained by calculating an average of plural corresponding picture element values in the plural second regions.

6. The image transforming apparatus according to claim 1, wherein the original image is a color image.

7. A method of image transforming using the apparatus of claim 1, wherein the values of the picture elements of the region in the first transformation image are compared with values of the picture elements of the corresponding region in the second transformation image.

* * * * *